US012656078B2

(12) United States Patent
Bushman et al.

(10) Patent No.: US 12,656,078 B2
(45) Date of Patent: Jun. 16, 2026

(54) GAS REGULATOR

(71) Applicant: METHOD DEVELOPMENT PRODUCTS LLC, Pinehurst, TX (US)

(72) Inventors: Jerod Bushman, Houston, TX (US); John Chambers, Houston, TX (US)

(73) Assignee: METHOD DEVELOPMENT PRODUCTS LLC, Pinehurst, TX (US)

( * ) Notice: Subject to any disclaimer, the term of this patent is extended or adjusted under 35 U.S.C. 154(b) by 0 days.

(21) Appl. No.: 19/314,357

(22) Filed: Aug. 29, 2025

(65) Prior Publication Data

US 2026/0078979 A1     Mar. 19, 2026

Related U.S. Application Data

(60) Provisional application No. 63/695,210, filed on Sep. 16, 2024.

(51) Int. Cl.
*F41B 11/723*     (2013.01)
*G05D 16/10*     (2006.01)

(52) U.S. Cl.
CPC .......... *F41B 11/723* (2013.01); *G05D 16/103* (2013.01); *G05D 16/109* (2019.01)

(58) Field of Classification Search
CPC ... F41B 11/723; G05D 16/103; G05D 16/109; Y10T 137/7793; Y10T 137/781; Y10T 137/7826; Y10T 137/87917
See application file for complete search history.

(56) References Cited

U.S. PATENT DOCUMENTS

| | | | |
|---|---|---|---|
| 5,036,878 A | | 8/1991 | Fournillon et al. |
| 8,171,950 B2 * | | 5/2012 | Colby ................... F41B 11/724 |
| | | | 137/15.01 |
| 12,181,062 B2 * | | 12/2024 | Qian ....................... F16K 17/04 |
| 2005/0103383 A1 * | | 5/2005 | Carroll ................. G06Q 10/109 |
| | | | 137/505.28 |
| 2006/0249132 A1 * | | 11/2006 | Gabrel .................. F41B 11/724 |
| | | | 124/70 |
| 2010/0175763 A1 | | 7/2010 | Newman et al. |

(Continued)

FOREIGN PATENT DOCUMENTS

| | | | |
|---|---|---|---|
| CN | 115111415 A | 9/2022 | |
| DE | 10063153 A1 * | 6/2002 | ........... G05D 16/109 |

(Continued)

OTHER PUBLICATIONS

International Search Report and Written Opinion issued in PCT/US2025/044167, dated Nov. 10, 2025 (10 pages).

*Primary Examiner* — Jessica Cahill
(74) *Attorney, Agent, or Firm* — Ewing & Jones, PLLC

(57) ABSTRACT

Apparatus and methods relate to gas regulators for use with paintball guns. The gas regulator includes a poppet housing interchangeable by a user to modify output pressure of the gas regulator. The poppet housing includes markings visible externally on the gas regulator indicating to the user the output pressure provided. The gas regulator may further include a rotatable adapter for coupling with a paintball gun. A regulator piston that functions to control the output pressure based on the poppet housing selected acts in some embodiments on an internal balanced piston for selectively opening and closing flow through the gas regulator.

18 Claims, 5 Drawing Sheets

(56)          References Cited

U.S. PATENT DOCUMENTS

| | | | | |
|---|---|---|---|---|
| 2015/0013776 | A1* | 1/2015 | Lammers | G05D 16/103 |
| | | | | 137/14 |
| 2015/0020899 | A1* | 1/2015 | Eyring | F16K 31/60 |
| | | | | 251/366 |
| 2018/0348800 | A1* | 12/2018 | Chen | G05D 16/166 |
| 2023/0359229 | A1 | 11/2023 | Chambers et al. | |

FOREIGN PATENT DOCUMENTS

| | | | | |
|---|---|---|---|---|
| EP | 2661575 | B1 | 8/2017 | |
| FR | 2602025 | A1* | 1/1988 | G05D 16/109 |

* cited by examiner

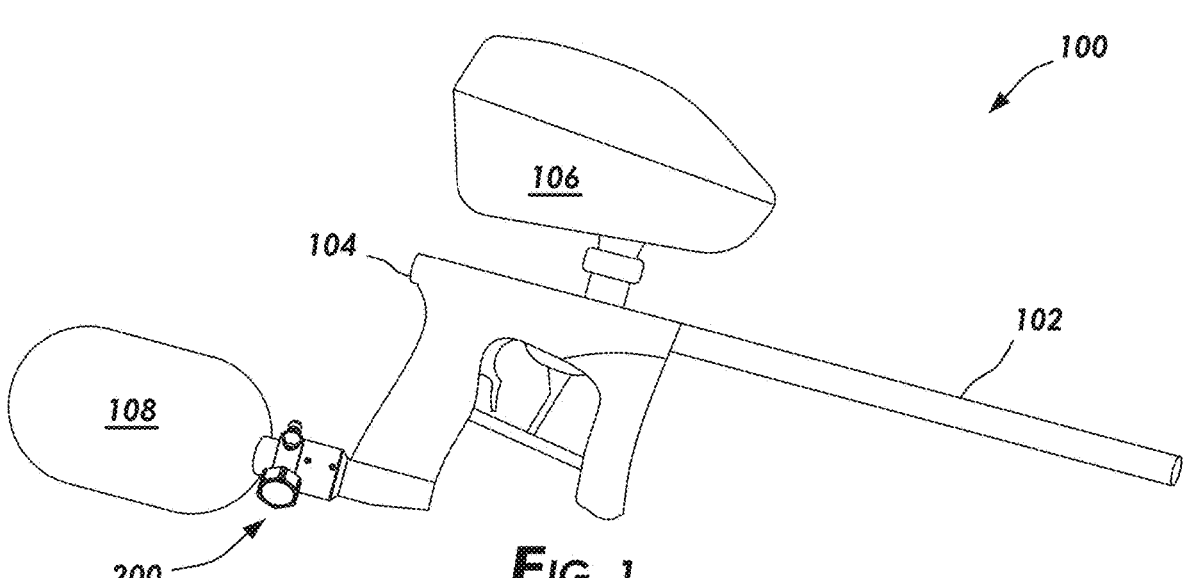
*F*IG. 1
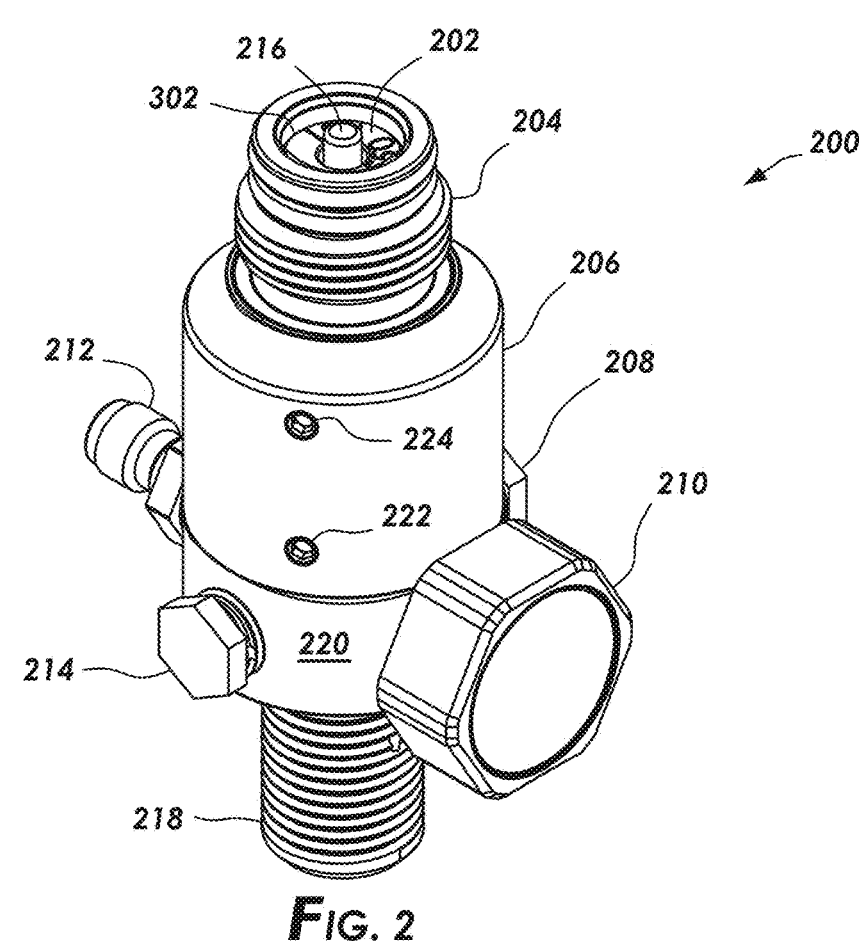
*F*IG. 2

*F*IG. 4

GAS REGULATOR

CROSS-REFERENCE TO RELATED APPLICATIONS

This application is a nonprovisional application which claims priority from U.S. provisional application No. 63/695,210, filed Sep. 16, 2024, which is incorporated by reference herein in its entirety.

TECHNICAL FIELD/FIELD OF THE DISCLOSURE

The present disclosure relates generally to gas regulators that may be used for paintball guns.

BACKGROUND OF THE DISCLOSURE

A paintball gun or marker couples to a source of compressed gas/air/nitrogen used to project a paintball at the required velocity. The source at a pressure of several thousand pounds per square inch (psi) often requires lowering of the pressure supplied to the paintball gun to an operating pressure, such as 350 psi to 1000 psi. The operating pressure though varies with different brands, models and years of the paintball gun.

Proper functioning of the paintball gun depends on the output pressure from the regulator being as specified for the paintball gun. Further, operating the paintball gun with the regulator that outputs the wrong pressure for the paintball gun can create a significant safety risk for the user. The internal parts of the paintball gun may also be damaged if a user attempts to use the wrong output pressure for the regulator.

Some regulators used for paintball guns either provide a fixed output pressure that cannot be adjusted or have external mechanical elements to adjust output pressure through a continuous range. While the fixed output pressure means a whole new regulator would be inefficiently required for different pressures, the continuous adjustable options place risk on the user that may be inexperienced with using regulators and relies on accurate functioning of pressure gauges to check the pressure. Other regulators use replaceable spring packs or shims that are fully internal to change output pressure. However, the user again must know or check the resulting output pressure and/or may be mistaken by memory or nonfunctional external parts indicating the output pressure that is not based on whatever modification is made inside of the regulator.

SUMMARY

A gas regulator includes a body with an end for coupling to a source of gas introduced into a high-pressure chamber of the gas regulator, a regulator piston moveable between an open position for gas flow through the gas regulator and a closed position with the gas flow blocked between the high-pressure chamber and a low-pressure chamber of the gas regulator, and a regulating spring acting on the regulator piston such that the regulator piston is moved to the closed position once the low-pressure chamber reaches a preset output pressure. A poppet housing engages the regulating spring to provide a force from the regulating spring to the regulator piston that results in the regulator piston being moved to the closed position at the preset output pressure. The poppet housing includes a pressure marking on a top face thereof visible externally on the gas regulator. The gas regulator further includes a poppet valve concentrically disposed in the poppet housing and configured to be depressed by a device gas inlet to supply the gas from the low-pressure chamber out of the gas regulator.

A method of changing pressure output from a gas regulator includes providing the gas regulator with a body having an end for coupling to a source of gas introduced into a high-pressure chamber of the gas regulator, a regulator piston moveable between an open position for gas flow through the gas regulator and a closed position with the gas flow blocked between the high-pressure chamber and a low-pressure chamber of the gas regulator, a regulating spring acting on the regulator piston such that the regulator piston is moved to the closed position based on pressure within the low-pressure chamber, and a poppet valve configured to be depressed by a device gas inlet to supply the gas from the low-pressure chamber out of the gas regulator. The method further includes removing a first poppet housing concentrically surrounding the poppet valve from the gas regulator. The first poppet housing engages the regulating spring to provide a first force from the regulating spring to the regulator piston that results in the regulator piston being moved to the closed position at a first output pressure as indicated by a first marking on the first poppet housing visible externally on the gas regulator. In addition, the method includes inserting a second poppet housing concentrically surrounding the poppet valve into the gas regulator. The second poppet housing engages the regulating spring to provide a second force from the regulating spring to the regulator piston that results in the regulator piston being moved to the closed position at a second output pressure different from the first output pressure as indicated by a second marking on the second poppet housing visible externally on the gas regulator.

A gas regulating system for use with a paintball gun includes a gas regulator having a body with an end for coupling to a source of gas introduced into a high-pressure chamber of the gas regulator, a regulator piston moveable between an open position for gas flow through the gas regulator and a closed position with the gas flow blocked between the high-pressure chamber and a low-pressure chamber of the gas regulator, a regulating spring acting on the regulator piston such that the regulator piston is moved to the closed position based on pressure within the low-pressure chamber, and a poppet valve configured to be depressed by connection with the paintball gun to supply the gas from the low-pressure chamber into the paintball gun. The gas regulating system also includes a first poppet housing insertable into the gas regulator to concentrically surround the poppet valve. The first poppet housing engages the regulating spring when in the gas regulator to provide a first force from the regulating spring to the regulator piston that results in the regulator piston being moved to the closed position at a first output pressure as indicated by a first marking on the first poppet housing visible externally on the gas regulator. Further, the gas regulating system includes a second poppet insertable into the gas regulator to concentrically surround the poppet valve. The second poppet housing engages the regulating spring when in the gas regulator to provide a second force from the regulating spring to the regulator piston that results in the regulator piston being moved to the closed position at a second output pressure different from the first output pressure as indicated by a second marking on the second poppet housing visible externally on the gas regulator.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a schematic view of a paintball gun including a gas regulator according to embodiments of the invention.

FIG. 2 is an isometric view of the gas regulator, in accordance with one embodiment of the invention.

DETAILED DESCRIPTION

Figure 3:
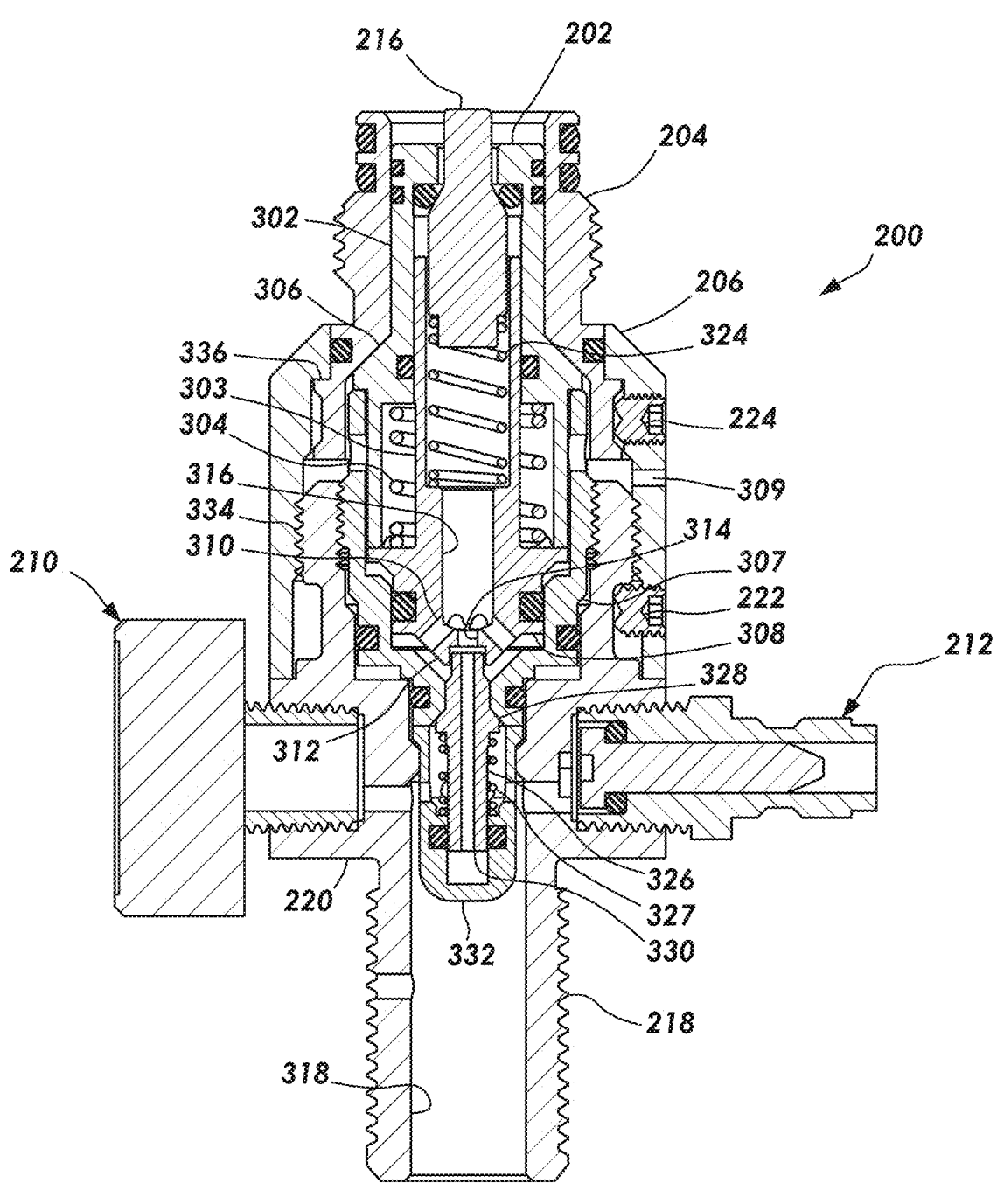
FIG. 3 is a sectional view of the gas regulator.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a paintball gun 100, also known as a marker, having a tank 108 with a gas regulator 200 that threads into a frame 104 of the paintball gun 100. The frame 104 couples to a hopper 106 for carrying paintballs to be fed into the frame 104. In operation, supply of compressed gas, such as air, carbon dioxide, or nitrogen, released from the tank 108 coupled to the gas regulator 200 and the frame 104 projects a paintball through a barrel 102 of the paintball gun 100.

FIG. 2 shows the gas regulator 200 with a top face 202 of a poppet housing 302 where markings (e.g., "550 PSI" etched and/or labeled on the top face 202 and/or coloring) indicate to a user the output pressure of the gas regulator 200. The top face 202 remains visible to the user with the gas regulator 200 fully assembled as provided in FIG. 2 or even while the tank 108 is coupled to the gas regulator 200. Accordingly, the user can know the output pressure of the gas regulator 200 with a simple visual check of the top face 202 to ensure suitable for use with the paintball gun 100 prior to coupling the gas regulator 200 to the paintball gun 100.

The gas regulator 200 includes a rotatable marker adapter 204 that can rotate within a cover 206 a full 360 degrees to provide desired orientation of the tank 108 and the gas regulator 200 once the rotatable marker adapter 204 is connected (e.g., by threads) to the paintball gun 100 or other device gas inlet. Features of the gas regulator 200 such as a low-pressure relief 208, a tank pressure gauge 210, a tank fill nipple 212 and a high-pressure relief 214 operate as standard for paintball applications. A poppet valve 216 extends within the rotatable marker adapter 204 and is likewise depressed as standard by connection of the gas regulator 200 with the paintball gun 100.

A threaded end 218 of a body 220 for the gas regulator 200 opposite of the rotatable marker adapter 204 couples to the tank 108. A cover lock screw 222 radially disposed into the cover may facilitate in securing the cover 206 to the body 220 by engaging a circumferential outside surface of the body 220 preventing relative rotation between the cover 206 and the body 220. Since the rotatable marker adapter 204 is otherwise free to turn, a rotational lock screw 224 radially disposed into the cover 206 may engage an outside circumferential surface of the rotatable marker adapter 204 to stop the rotatable marker adapter 204 from rotating once the user has oriented the gas regulator 200 as desired.

FIG. 3 illustrates internal aspects of the gas regulator 200 with the poppet housing 302 disposed concentrically within the rotatable marker adapter 204 and engaged with a regulator piston 303. A regulating spring 304 located in an annular area between the poppet housing 302 and the regulator piston 303 acts on the regulator piston 303. An internal bore diameter at a bottom end of the poppet housing 302 being larger than an outside diameter of the regulator piston 303 defines the annular area for the regulating spring 304. Where the outside diameter of the regulator piston 303 increases to support the regulating spring 304, a lower terminal end face of the poppet housing 302 may provide interference limiting upward movement of the regulator piston 303. Therefore, longitudinal extent of the annular area for the regulating spring 304 depends on how long the poppet housing 302 extends and/or how far toward the bottom end of the poppet housing 302 that the internal bore diameter becomes larger than the outside diameter of the regulator piston 303 to form the annular area. A poppet housing shoulder 306 retains the poppet housing 302 that is further trapped from movement in the gas regulator 200 by a top of a regulator piston housing 307 contacting an opposite face of the poppet housing shoulder 306. In some embodiments, the regulator piston housing 307 threads into the body 220 as shown or may be formed integral with the body 220.

Figure 4:
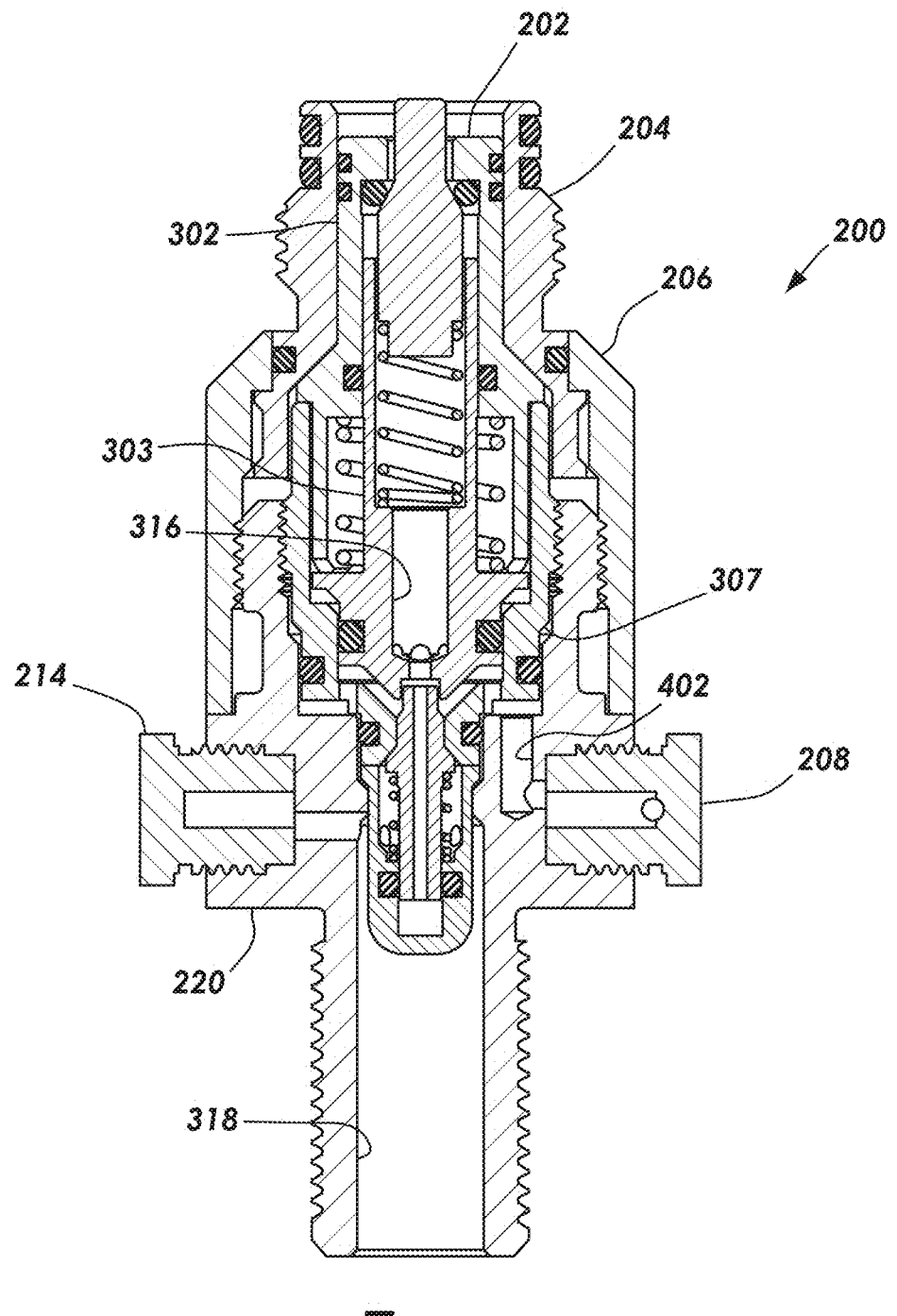
FIG. 4 is a sectional view of the gas regulator taken offset at a right angle relative to the sectional view in FIG. 3.

The regulating spring 304 pushes the regulator piston 303 that is slidably sealed within the poppet housing 302 and the regulator piston housing 307 toward an open position of the gas regulator 200. Gas pressure acting on a drive side 308 of the regulator piston 303 counteracts with the regulating spring 304 and pushes the regulator piston 303 toward a closed position (as shown in FIG. 3 and FIG. 4). Various seals (e.g., O-rings as shown) in the gas regulator 200 separate an atmospheric vent channel 309 from angled bores 310 proximate engagement end 312 of regulator piston 303 and gas pathway 314 all in communication with and part of a low-pressure chamber 316. Within the gas regulator 200, other of the seals further separate the low-pressure chamber 316 that outputs gas to the paintball gun 100 from a high-pressure chamber 318 inputting gas from the tank 108.

The gas within the low-pressure chamber 316 thus passes around the poppet valve 216 and into the paintball gun 100 when an external force caused by connection of the paintball gun 100 overcomes bias of a poppet spring 324 urging the poppet valve 216 upward into a sealed position within the poppet housing 302. The poppet spring 324 and a bottom portion of the poppet valve 216 may be contained and free to move along a longitudinal central bore through and out of an upper portion of the regulator piston 303. The upper portion of the regulator piston 303 slidably seals within the poppet housing 302 while a lower portion of the regulator piston 303 slidably seals in the regulator piston housing 307.

The tank pressure gauge 210 tells the user amount of gas remaining in the tank 108 by being in communication with the high-pressure chamber 318 of the gas regulator 200. The communication of the high-pressure chamber 318 with the tank fill nipple 212 also allows the tank 108 to be refilled when needed. As shown, respective radial bores on opposite sides in the body 220 provide the communication of the tank pressure gauge 210 and the tank fill nipple 212 with the high-pressure chamber 318.

The engagement end 312 of the regulator piston 303 makes operative contact with a balanced piston 326. Without the regulator piston 303 acting to move the balanced piston 326, a balanced piston spring 327 pushes the balanced piston 326 to seat in the regulator piston housing 307 and form a main seal 328 to block gas flow between the low-pressure and high-pressure chambers 316, 318 in the closed position. The balanced piston 326 and/or the regulator piston housing 307 where interfacing to form the main seal 328 may define a needle valve with one or both having polymeric sealing materials. A balanced piston bore 330 through the balanced piston 326 keeps pressure equalized on both sides of the balanced piston 326 disposed in a balanced piston housing 332. The balanced piston housing 332 may be dropped into and retained within the body 220 by abutting contact of a top of the balanced piston housing 332 with a bottom of the regulator piston housing 307 keeping an outward flange of the balanced piston housing 332 against an inner shoulder of a longitudinal bore through the body 220.

FIG. 3 also shows how the rotatable marker adapter 204 can turn. Specifically, a threaded connection 334 may secure the cover 206 to the body 220 with the cover 206 surrounding a lower portion of the rotatable marker adapter 204 while an upper portion of the rotatable marker adapter 204 extends from the cover 206. The rotatable marker adapter 204 then becomes trapped from axial movement, while permitting rotational movement, by a shoulder interface 336 between the cover 206 and an outside of the lower portion of the rotatable marker adapter 204 along with contact of the poppet housing shoulder 306 with an inside surface of the rotatable marker adapter 204.

FIG. 4 shows a low-pressure channel 402 connecting the low-pressure relief 208 to the low-pressure chamber 316. The high-pressure relief 214 connects via another radial bore in the body 220 to the high-pressure chamber 318. In some embodiments, a burst disc provides the low-pressure relief 208 with a relatively lower burst pressure than a burst disc used for the high-pressure relief 214. For example, the high-pressure relief 214 may relieve pressures above 7500 psi while the low-pressure relief 208 may relieve pressures above 1800 psi.

In operation of the gas regulator 200, gas in the high-pressure chamber 318 enters the balanced piston housing 332. In the open position, the regulating spring 304 forces the engagement end 312 of the regulator piston 303 to move the balanced piston 326 away from seating in the regulator piston housing 307. Some of the gas then passes through a gap at the main seal 328 between the balanced piston 326 and the regulator piston housing 307 flowing through angled bores 310 in the regulator piston 303 into the low-pressure chamber 316. The angled bores 310 may be oriented relative to longitudinal bores and/or flow through the gas regulator 200 at an angle less than 90 degrees, such as 45 degrees or between 20 degrees and 70 degrees, to limit disruption of axial flow through the gas regulator 200. The gas next passes through the longitudinal central bore of the regulator piston 303 and out of the gas regulator 200 between the poppet housing 302 and the poppet valve 216 that has been depressed. The gas also passes through the gas pathway 314 in the regulator piston 303 and the balanced piston bore 330 to keep pressure equalized across the balanced piston 326.

Once the gas acting on the drive side 308 of the regulator piston 303 overcomes the regulating spring 304 force as dictated by the poppet housing 302 being used, the regulator piston 303 moves away from contact with the balanced piston 326 allowing the balanced piston spring 327 to push the balanced piston 326 into seating in the regulator piston housing 307 closing flow through the main seal 328. The atmospheric vent channel 309 may function to not block the movement of the regulator piston 303 to the closed position. While not required in all embodiments, the main seal 328 design using the balanced piston 326 improves repeatability in obtaining the output pressure desired relative to use of a seal directly coupled with the regulator piston 303. Embodiments of the gas regulator 200 may thus regulate input pressures of between 3000 psi and 4500 psi down to, depending on the poppet housing 302 being used, various discrete operational pressures between 350 psi and 1000 psi for use with different paintball guns.

The poppet housing 302 may be interchangeable with other ones of the poppet housing 302 that provide different output pressures from the gas regulator 200 and are each accordingly marked on the top face 202 with the output pressure that is produced. Since compression of the regulating spring 304 is determined by physical attributes of the poppet housing 302 that as already discussed herein define the annular area where the regulating spring 304 is located, changing out of the poppet housing 302 to others with different physical attributes provides an easy and cost-effective way to discretely change the output pressure of the gas regulator 200 to known predefined pressures. A single machined part forming the poppet housing 302 is thus replaceable while reusing the same spring for each of the discrete pressures desired. The marking on the top face 202 being integral with the poppet housing 302 that is the mechanical way to make discrete changes to the output pressure of the gas regulator 200 limits potential user errors in adjusting or knowing the output pressure.

For changing the output pressure of the gas regulator 200, the user backs out the cover lock screw 222 and unscrews the cover 206 from the body 220. The user then takes the cover 206 away from the body 220 along with the rotatable marker adapter 204 and removes the poppet housing 302 that originally provided the output pressure as marked on the top face 202 (e.g., 550 PSI). The regulator piston 303 with the regulating spring 304 disposed around the upper portion of the regulator piston 303 remains with the rest of the gas regulator 200. If the poppet valve 216 comes off with the poppet housing 302, the user simply places the poppet valve 216 back into the regulator piston 303. The user next places a new one of the poppet housing 302 with the output pressure that is now desired and is again marked on the top face 202 (e.g., 450 PSI) either into the rotatable marker adapter 204 or onto the regulator piston 303 prior to reassembling the cover 206 on the body 220. In some embodiments, the gas regulator 200 comes as a kit with multiple ones of the poppet housing 302 (e.g., an 800 psi output pressure poppet housing, a 450 psi output pressure poppet housing, and a 300 psi output pressure poppet housing) included to make discrete changes of the output pressure for the gas regulator 200.

Figure 5:
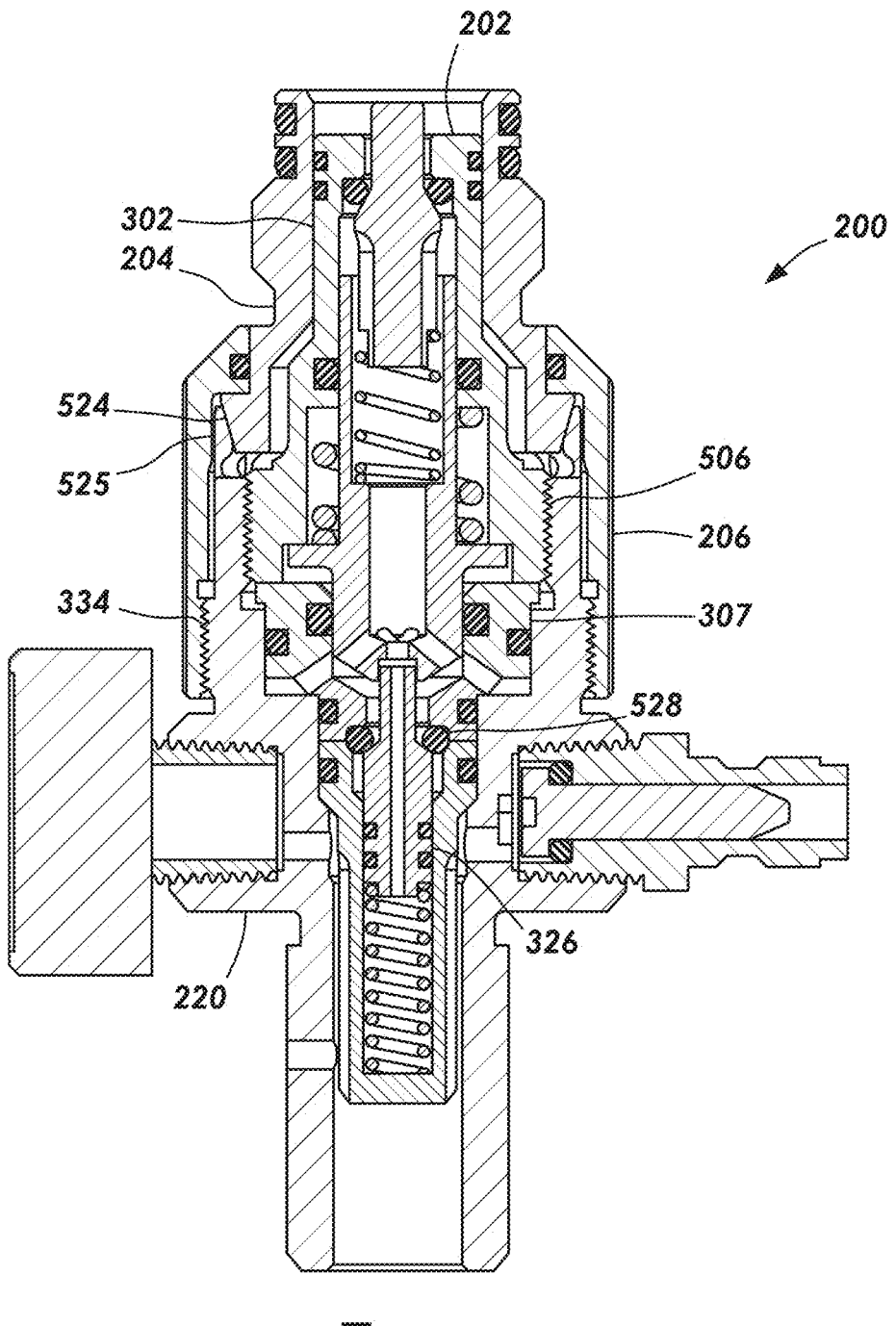
FIG. 5 is a sectional view of the gas regulator showing an optional assembly, in accordance with one embodiment of the invention.

FIG. 5 depicts the gas regulator 200 that operationally functions as described above regarding FIGS. 2-4 with alternative configurations for certain aspects. The rotatable marker adapter 204 may include a wedge end 524 where the bottom of the rotatable marker adapter 204 tapers corresponding to tapering of a collet end 525 at the top of the body 220. While the cover 206 remains loosely connected via the threaded connection 334 to the body 220, the rotatable marker adapter 204 can rotate. Tightening of the threaded connection 334 causes the wedge end 524 and the collet end 525 to engage each other expanding the collet end 525 into the cover 206 and rotationally locking the rotatable marker adapter 204 with respect to the body 220. The wedge end 524 and the collet end 525 thus provide an alternative to use of set screws for rotational locking of the cover 206 and/or the rotatable marker adapter 204.

In some embodiments, the poppet housing 302 may have external poppet threads 506 for mating with either the regulator piston housing 307 or, as shown in FIG. 5, the body 220. The external poppet threads 506 on the poppet housing 302 secure the poppet housing 302 relative to the body 220. The external poppet threads 506 used thereby limits high pressure being applied to the rotatable marker adapter 204 and/or the cover 206.

For some embodiments, the balanced piston 326 may be formed of a material, such as stainless steel, which may further rely on sealing by using an O-ring 528. Elastomeric material of the O-ring 528 facilitates in creating the desired sealing. The bottom of the regulator piston housing 307 may include a groove for retaining the O-ring 528 for functional engagement with the balanced piston 326.

Figure 6:
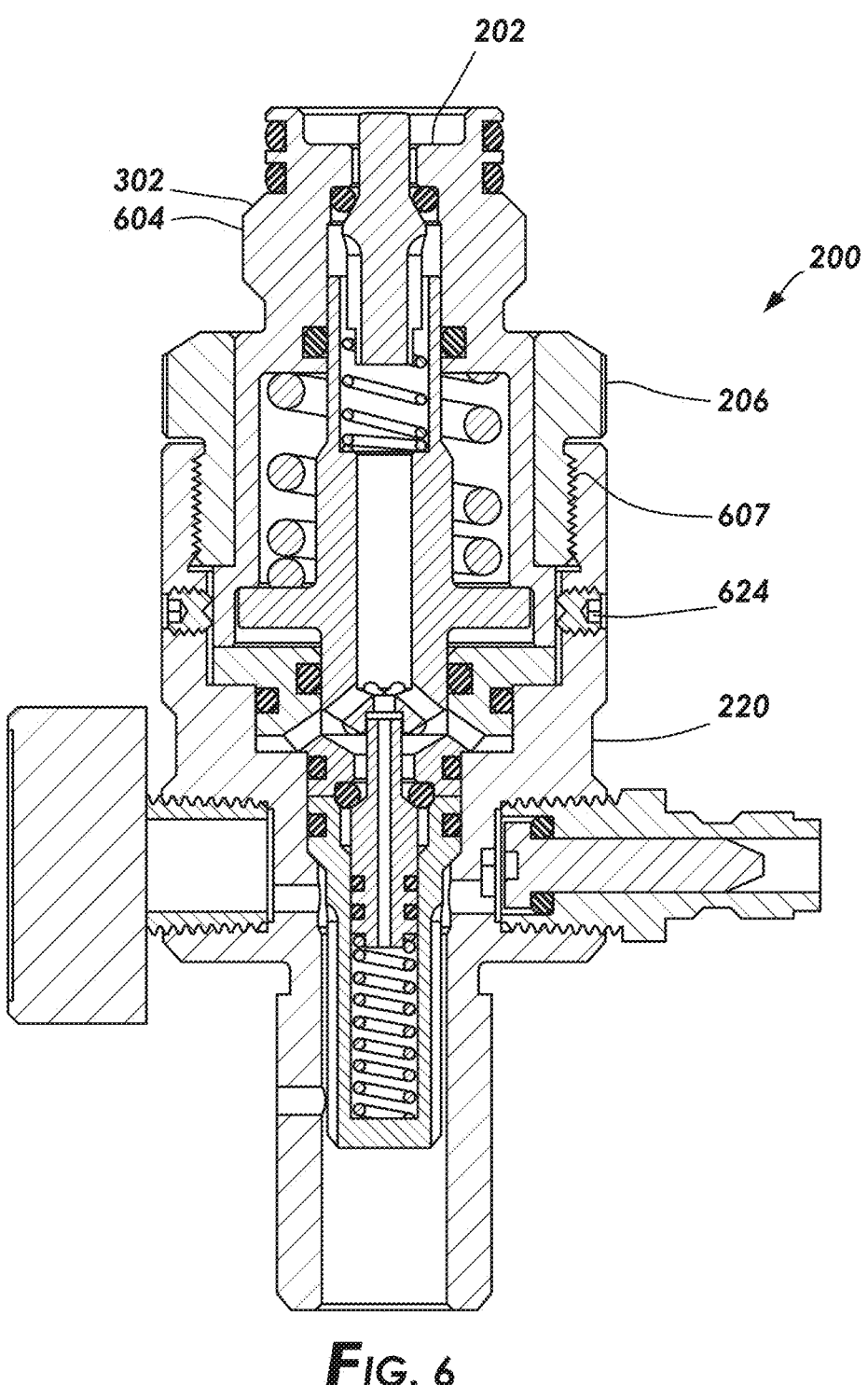
FIG. 6 is a sectional view of the gas regulator showing another optional assembly, in accordance with one embodiment of the invention.

FIG. 6 depicts the gas regulator 200 that operationally functions as described above regarding FIGS. 2-4 with further alternative options for different features. For some embodiments, the cover 206 may use an internal thread connection 607 within the body 220. The cover 206 may abut an outward shoulder of the poppet housing 302 for retainment of the poppet housing 302 in the body 220. Prior to tightening the internal thread connection 607, the poppet housing remains rotatable relative to the body 220. A rotation locking screw 624 threaded radially into the body 220 and into contact with an outside circumference of the poppet housing 302 may facilitate rotational locking of the poppet housing 302 relative to the body 220.

In some embodiments, the poppet housing 302 includes marker connection threads 604. The marker connection threads 604 enable direct coupling of the poppet housing 302 to the paintball gun 100 without intervening elements. Rotation for alignment of the tank 108 remains possible due to the rotatability of the poppet housing 302 shown in FIG. 6 prior to being rotationally locked down.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A gas regulator, comprising:
   a body with an end for coupling to a source of gas introduced into a high-pressure chamber of the gas regulator;
   a regulator piston moveable between an open position for gas flow through the gas regulator and a closed position with the gas flow blocked between the high-pressure chamber and a low-pressure chamber of the gas regulator;
   a regulating spring acting on the regulator piston such that the regulator piston is moved to the closed position once the low-pressure chamber reaches a preset output pressure;
   a poppet housing engaging the regulating spring to provide a force from the regulating spring to the regulator piston that results in the regulator piston being moved to the closed position at the preset output pressure, wherein a top face of the poppet housing includes a pressure marking visible externally on the gas regulator; and
   a poppet valve concentrically disposed in the poppet housing and configured to be depressed by a device gas inlet to supply the gas from the low-pressure chamber out of the gas regulator,
   wherein:
      the regulating spring urges the regulator piston toward and into contact with a balanced piston to move the balanced piston away from a sealing seat permitting the gas flow between the high-pressure chamber and the low-pressure chamber; and
      gas pressure on a drive side of the regulator piston counteracts the force of the regulating spring to urge the regulator piston away from the balanced piston that is thereby biased toward and into contact with the sealing seat blocking the gas flow between the high-pressure chamber and the low-pressure chamber.

2. The gas regulator of claim 1, wherein the poppet housing is interchangeable with additional ones of the poppet housing having physical attributes to alter engagement with the regulating spring resulting in the preset output pressure being different.

3. The gas regulator of claim 1, further comprising additional ones of the poppet housing having different values for the preset output pressure such that the poppet housing that is disposed engaging the regulator spring is selectable based on specified input pressure for the device gas inlet.

4. The gas regulator of claim 1, further comprising an adapter disposed around the poppet housing for coupling with the device gas inlet.

5. The gas regulator of claim 1, further comprising an adapter that is disposed around the poppet housing for coupling with the device gas inlet and is secured to the body by a cover while being rotatable 360 degrees relative to the body.

6. The gas regulator of claim 1, further comprising:
   a rotatable adapter disposed around the poppet housing for coupling with the device gas inlet;
   a cover secured to the body by a threaded connection and surrounding a lower portion of the rotatable adapter retained inside the cover by a shoulder interface with an upper portion of the rotatable adapter extending from the cover; and
   a selective stop that prevents the rotatable adapter from turning, wherein the selective stop is either a rotational lock screw radially disposed into the cover for engaging an outside circumferential surface of the rotatable adapter or a wedge/collet arrangement of the rotatable adapter.

7. The gas regulator of claim 1, further comprising a cover secured to the body by a threaded connection to axially fix the poppet housing relative to the body.

8. The gas regulator of claim 1, further comprising the balanced piston acted on by the regulator piston, wherein the balanced piston is in the form of a needle valve that selectively blocks the gas flow between the high-pressure chamber and the low-pressure chamber.

9. The gas regulator of claim 1, wherein the regulator piston includes a longitudinal central bore in communication with the drive side of the regulator piston via angled bores oriented less than 90 degrees relative to the longitudinal central bore.

10. The gas regulator of claim 1, wherein the poppet valve is biased by a poppet spring into a sealed position within the poppet housing.

11. The gas regulator of claim 1, wherein the poppet housing or an adapter disposed around the poppet housing includes a threaded coupling to connect with the device gas inlet that is part of a paintball gun.

12. The gas regulator of claim 1, wherein the end of the body is threaded for coupling to a tank that provides the source of the gas.

13. The gas regulator of claim 1, further comprising an adapter disposed around the poppet housing for threaded coupling with the device gas inlet that is part of a paintball gun, wherein the end of the body is threaded for coupling to a tank that provides the source of the gas.

14. A method of changing pressure output from a gas regulator, comprising:

> providing the gas regulator including:
>> a body with an end for coupling to a source of gas introduced into a high-pressure chamber of the gas regulator;
>> a regulator piston moveable between an open position for gas flow through the gas regulator and a closed position with the gas flow blocked between the high-pressure chamber and a low-pressure chamber of the gas regulator;
>> a regulating spring acting on the regulator piston such that the regulator piston is moved to the closed position based on pressure within the low-pressure chamber; and
>> a poppet valve configured to be depressed by a device gas inlet to supply the gas from the low-pressure chamber out of the gas regulator;
> removing a first poppet housing concentrically surrounding the poppet valve from the gas regulator, wherein the first poppet housing engages the regulating spring to provide a first force from the regulating spring to the regulator piston that results in the regulator piston being moved to the closed position at a first output pressure as indicated by a first marking on the first poppet housing visible externally on the gas regulator; and
> inserting a second poppet housing concentrically surrounding the poppet valve into the gas regulator, wherein the second poppet housing engages the regulating spring to provide a second force from the regulating spring to the regulator piston that results in the regulator piston being moved to the closed position at a second output pressure different from the first output pressure as indicated by a second marking on the second poppet housing visible externally on the gas regulator.

15. The method of claim 14, further comprising coupling the gas regulator to a paintball gun and the source of the gas.

16. The method of claim 14, wherein the first and second markings are etched on a top face respectively of the first and second poppet housings.

17. A gas regulating system for use with a paintball gun, comprising:

> a gas regulator including:
> a body with an end for coupling to a source of gas introduced into a high-pressure chamber of the gas regulator;
> a regulator piston moveable between an open position for gas flow through the gas regulator and a closed position with the gas flow blocked between the high-pressure chamber and a low-pressure chamber of the gas regulator;
> a regulating spring acting on the regulator piston such that the regulator piston is moved to the closed position based on pressure within the low-pressure chamber; and
> a poppet valve configured to be depressed by connection with the paintball gun to supply the gas from the low-pressure chamber into the paintball gun;
> a first poppet housing insertable into the gas regulator to concentrically surround the poppet valve, wherein the first poppet housing engages the regulating spring when in the gas regulator to provide a first force from the regulating spring to the regulator piston that results in the regulator piston being moved to the closed position at a first output pressure as indicated by a first marking on the first poppet housing visible externally on the gas regulator; and
> a second poppet housing insertable into the gas regulator to concentrically surround the poppet valve, wherein the second poppet housing engages the regulating spring when in the gas regulator to provide a second force from the regulating spring to the regulator piston that results in the regulator piston being moved to the closed position at a second output pressure different from the first output pressure as indicated by a second marking on the second poppet housing visible externally on the gas regulator.

18. The gas regulating system of claim 17, wherein:

> the first marking is visible in an annulus between the poppet valve and an adapter for coupling the gas regulator with the paintball gun when the first poppet housing is in the gas regulator; and
> the second marking is visible in the annulus between the poppet valve and the adapter when the second poppet housing is in the gas regulator.

\* \* \* \* \*